Patented Nov. 6, 1923.

1,472,860

UNITED STATES PATENT OFFICE.

STEFANUS JOHANNES VERMAES, OF DELFT, NETHERLANDS, ASSIGNOR TO SYNDICAAT "ELECTRO-STAAL" OF THE HAGUE, NETHERLANDS.

PROCESS FOR THE MANUFACTURE OF IRON FROM IRON ORES.

No Drawing.     Application filed April 26, 1920. Serial No. 376,758.

*To all whom it may concern:*

Be it known that I, STEFANUS JOHANNES VERMAES, a subject of the Queen of the Netherlands, residing at Delft, in the Province of South-Holland, Kingdom of the Netherlands, have invented certain new and useful Improvements in a Process for the Manufacture of Iron from Iron Ores, of which the following is a specification.

In the known blast furnace processes, the gas for the reduction of the oxids is obtained by burning carbon in the presence of air, from which is derived the advantage that in the formation of carbon-dioxid which is converted into carbon-monoxid, the necessary heat is evolved for melting the reduced iron and its impurities with the added flux to a slag. Such process, however, has the drawback that the oxygen necessary for the formation of the carbon-monoxid is taken from the air, so that a very large quantity of nitrogen, which is really inactive in the process, accompanies the active gases to the furnace and other apparatus as a useless material. The object of the present invention is to overcome or remove this drawback by excluding the air until the ore is reduced, and only admitting air to the fuel gases when removed from the reduction furnace in order to burn these gases for producing heat for the reduction and melting.

It has long been known to reduce finely divided iron oxid with finely divided carbon without access or air, by external or indirect heating in a retort for the purpose of obtaining iron sponge. This reduction has always been carried out at a comparatively low temperature, not exceeding redness. The product obtained was a very oxidizable form of iron, even inflammable or pyrophoric. The gas produced by this reduction contained much $CO_2$ and the speed of the reaction was slow. The evolved gas was therefore by no means sufficient to heat the reduction retort and generally escaped unused. If preheating was resorted to, the mixture of iron oxide and carbon was preheated to a temperature which was necessarily below the lowest reduction temperature.

These processes have all proven practical failures, the reaction proceeding too slowly and requiring too much fuel to obtain commercial results.

In laboratory experiments it has been found that by mixing together finely-divided fuel and finely-divided ore at a temperature which need not exceed 1100° C., a very rapid action takes place, by which solid metallic iron and a large amount of gas are obtained. The constitution of the gas depends on that of the carbon or coal used, but in any case the gas has a high caloric value because, with the exception of a small percentage of nitrogen derived from the coal, it consists wholly of carbon-monoxid, hydrogen and hydrocarbons.

This has led to a wholly new process for obtaining metallic iron from iron ore. The above-mentioned gas of high caloric value will be sufficient (as may be calculated) to furnish the heat necessary for the reaction of the carbon on the iron oxid, and also for the melting of the metallic iron obtained and for the removal of the impurities in a slag. Because the reaction in which the iron is reduced and by which the heating gas is formed must take place without admission of air or products of combustion and, therefore, indirectly by heat transmitted by the walls of the room in which the reaction is effected, it is necessary to preheat the charge, preferably by direct heating, for which purpose a part of the gas produced in the reaction may be utilized.

This preheating has an oxidizing effect, as will be understood, and it results in the conversion of difficultly-reducible oxids such as magnetite and titaniferous iron-sand into compounds which contain more oxygen and which are more easily reduced. Also, water-containing ores, such as loam ore of Celebes or Cuba, are dehydrated without loss of added heat; while iron carbonates, which in other processes are subjected to a preliminary roasting and must afterwards cool before being charged into the furnace, may be treated directly at the temperature obtained by the added heat.

Though it is not impossible to apply the present process in existing types of furnaces, for example a muffle furnace in which the charge may be separated from the combustion gases, it is preferable to utilize a rotating furnace in which the pure gases are kept separate from the charge.

The process may be carried out as follows: Iron ore in a finely-divided condition (it may be comminuted if desired) is charged into a rotary kiln of known type, in which it is brought to a temperature of 1100° C., or higher, by direct heating, and sinks down with the added flux or fluxes (which should also be brought to the temperature indicated) and is ultimately mixed with the same in a reducing furnace in which the combustion gases are kept separate from the room wherein the reduction takes place and in which, at the same time, the quantity of carbon necessary for reducton is supplied at regular intervals.

The metallic iron (in solid condition) thereby formed is drawn off at the discharge side of the furnace without access of air, and introduced into a flaming furnace wherein it is melted and separated from the slag and is then poured into molds or is discharged into a second flaming furnace in which the final purification and eventual carbonizing take place. A part of the gas produced is burned in the heating channels of the reduction furnace, while another part is utilized for heating the flaming furnace, and a third part may be used for directly pre-heating the ore and added flux in the rotary furnace.

The advantages derived from the present process are as follows:

The product obtained is more or less sintered, and is much denser and much less subject to oxidation and, hence, is much easier to handle and to fuse than iron sponge, which latter is obtained at low temperatures and is so finely divided that it is generally pyrophoric or, at least, extremely subject to oxidation.

A finely-divided ore is used, thus obviating the necessity for briquetting prior to melting the ore in the blast furnace;

The ores of Java (also titaniferous iron ore), the loam ore of Cuba and Celebes, magnetite separated from magnetite-containing rock, roasted and de-copperized pyrites and the like may be treated directly. In the case of lumpy ores, there seems to be a drawback, because they must first be milled; but the costs of milling will be partly or wholly compensated by the easy loading and unloading of the fine material as compared with large lumps;

The special qualities required for blast furnace cokes are no longer essential. Any carbonized or uncarbonized fuel may be used, provided that its moisture content is not too high to interfere with the heat balance, which may always be prevented by drying the fuel beforehand, utilizing for that purpose heat which would otherwise be lost;

The blast furnace is replaced by smaller and more reliable apparatus, the addition of a large quantity of air under very high pressure is done away with, as also the usual large heating apparatus, and the caloric value of the gas by which the necessary heat is produced is so high that pre-heating of the air for combustion will at most be necessary only for the melting furnace;

No pig iron with high carbon content is obtained because the temperature in the reduction furnace is too high to effect any considerable carbonization of the iron in the short period it remains in the furnace;

Decorbonizing in the converter, with the mechanism necessary therefor, is done away with;

The process is not influenced by the moisture content of the air as is the case in blast furnace processes, in which latter it has sometimes been necessary to dry the air by means of a preliminary cooling operation requiring costly apparatus which probably could not be dispensed with in a tropical climate.

I claim as my invention:—

1. A process for the manufacture of iron from iron ores, comprising preheating the finely-divided iron ore to a high temperature; mixing the heated ore in a reducing furnace with finely-divided solid fuel without access of air or gases; heating said furnace externally to maintain the mixture of ore and fuel at such a temperature that a rapid reaction between the fuel and the oxygen of the ore is effected; drawing off the solid metallic iron thus formed without access of air; and then melting said metallic iron and separating it from the slag.

2. A process for the manufacture of iron from iron ores, comprising preheating the finely-divided iron ore to approximately 1100° C. by direct oxidizing heating; mixing the heated ore in a reducing furnace with finely-divided solid fuel without access of air or gases; heating said furnace externally to maintain the mixture of ore and fuel at such a temperature that a rapid reaction between the fuel and the oxygen of the ore is effected; drawing off the solid metallic iron thus formed without access of air; and then melting said metallic iron and separating it from the slag.

3. A process for the manufacture of iron from iron ores, comprising mixing the finely-divided iron ore with a flux; preheating the mixture to a high temperature; mixing the heated mixture of ore and flux in a reducing furnace with finely-divided solid fuel without access of air or gases; heating said furnace externally to maintain the mixture of ore, flux and fuel at such a temperature that a rapid reaction between the fuel and the oxygen of the ore is effected; drawing off the solid metallic iron thus formed without access of air; and then melting said metallic iron and separating it from the slag.

4. A process for the manufacture of iron from iron ores, comprising preheating the finely-divided iron ore to a high temperature mixing the heated ore in a reducing furnace with finely-divided solid fuel without access of air or gases; heating said furnace externally to maintain the mixture of ore and fuel at such a temperature that a rapid reaction between the fuel and the oxygen of the ore is effected; drawing off the solid metallic iron thus formed without access of air; and then melting said metallic iron by the direct heating action produced by the combustion of a portion of the gas formed in the furnace by the reduction of the ore and separating it from the slag.

5. A process for the manufacture of iron from iron ores, comprising preheating the finely-divided iron ore to a high temperature; mixing the heated ore in a reducing furnace with finely-divided solid fuel without access of air or gases; heating said furnace externally to maintain the mixture of ore and fuel at such a temperature that a rapid reaction between the fuel and the oxygen of the ore is effected, and burning a portion of the gas formed in the furnace by the reduction of the ore to effect the preheating of the ore; drawing off the solid metallic iron formed in the reducing furnace without access of air; and then melting said metallic iron and separating it from the slag.

6. A process for the manufacture of iron from iron ores, comprising preheating the finely-divided iron ore to a high temperature; mixing the heated ore in a reducing furnace with finely-divided solid fuel without access of air or gases; heating said furnace externally to maintain the mixture of ore and fuel at such a temperature that a rapid reaction between the fuel and the oxygen of the ore is effected, and burning a portion of the gas formed in the furnace by the reduction of the ore to effect the indirect heating of said furnace; drawing off the solid metallic iron formed in the reducing furnace without access of air; and then melting said metallic iron and separating it from the slag.

7. A process for the manufacture of iron from iron ores, comprising preheating finely divided iron ore to approximately 1100° C. by direct heating; mixing the heated ore in a reducing furnace with finely-divided solid fuel without access of air or gas; heating said furnace externally and maintaining therein a temperature at which a rapid reaction between the fuel and the ore takes place with production of a combustible gas nearly free from carbonic acid gas; drawing off the metallic iron thus formed without access of air; and melting said metallic iron by the direct heating action produced by the combustion of a portion of the gas formed in the reducing furnace, while using another portion of said gas for the indirect heating of the reducing furnace and for the direct preheating of the ore.

In testimony whereof, I have hereunto set my hand.

STEFANUS JOHANNES VERMAES.